(12) United States Patent
Al-Hashmy et al.

(10) Patent No.: US 11,161,758 B2
(45) Date of Patent: Nov. 2, 2021

(54) MICROWAVE BASED SYSTEMS FOR BACTERIA REMOVAL FROM WATER COOLING TOWERS

(71) Applicant: Saudi Arabian Oil Company, Dhahran (SA)

(72) Inventors: Hassan Ali Al-Hashmy, Dhahran (SA); Enrico Bovero, Dhahran (SA); Aziz Fihri, Paris (FR); Mohamed Bouhrara, El Jadida (MA)

(73) Assignee: Saudi Arabian Oil Company, Dhahran (SA)

( * ) Notice: Subject to any disclaimer, the term of this patent is extended or adjusted under 35 U.S.C. 154(b) by 85 days.

(21) Appl. No.: 16/700,772

(22) Filed: Dec. 2, 2019

(65) Prior Publication Data

US 2021/0163314 A1 Jun. 3, 2021

(51) Int. Cl.
*C02F 1/30* (2006.01)
*C02F 103/02* (2006.01)

(52) U.S. Cl.
CPC ........ *C02F 1/302* (2013.01); *C02F 2103/023* (2013.01); *C02F 2201/005* (2013.01); *C02F 2209/02* (2013.01)

(58) Field of Classification Search
None
See application file for complete search history.

(56) References Cited

U.S. PATENT DOCUMENTS

| | | |
|---|---|---|
| 3,261,140 A | 7/1966 | Long et al. |
| 3,670,891 A | 6/1972 | Allen |
| 4,013,558 A | 3/1977 | Rosenberg |
| 5,338,557 A | 8/1994 | Pare |
| 7,705,058 B2 | 4/2010 | Coutinho et al. |
| 7,887,708 B2 | 2/2011 | Chew |
| 8,518,324 B2 | 8/2013 | Chandrasekhar |
| 8,679,401 B2 | 3/2014 | Stull, Jr. et al. |
| 8,754,041 B2 | 6/2014 | Atieh et al. |
| 9,242,874 B1 | 1/2016 | Arndt et al. |
| 9,642,385 B2 | 5/2017 | Tang et al. |
| 2001/0050215 A1 | 12/2001 | Li et al. |
| 2006/0006172 A1* | 1/2006 | Sedlmayr ............ B01D 1/2896 219/688 |
| 2011/0014331 A1 | 1/2011 | Stull, Jr. et al. |

(Continued)

FOREIGN PATENT DOCUMENTS

| | | |
|---|---|---|
| CN | 107875674 A | 11/2017 |
| CN | 207061894 U | 3/2018 |

(Continued)

OTHER PUBLICATIONS

International Search Report and Written Opinion in Corresponding PCT Application No. PCT/US2020/062639 dated Mar. 10, 2021. 14 pages.

(Continued)

*Primary Examiner* — Richard C Gurtowski

(74) *Attorney, Agent, or Firm* — Leason Ellis LLP

(57) ABSTRACT

A system is provided that utilizes electromagnetic energy for bacteria elimination from cooling systems, such as water cooling tower systems that are used to cool down a heat exchanger in oil industry and it can be also extended to be used in the bacteria removal associated to crude oil.

21 Claims, 5 Drawing Sheets

(56) References Cited

U.S. PATENT DOCUMENTS

| | | | |
|---|---|---|---|
| 2015/0027890 A1* | 1/2015 | Jha | B01J 39/05 |
| | | | 204/520 |
| 2015/0258588 A1 | 3/2015 | Moon et al. | |
| 2018/0104653 A1 | 4/2018 | Zhang et al. | |
| 2018/0178144 A1 | 6/2018 | Lu et al. | |
| 2018/0251384 A1* | 9/2018 | Lytle | C02F 1/302 |

FOREIGN PATENT DOCUMENTS

| | | | |
|---|---|---|---|
| CN | 108996654 A | 12/2018 |
| JP | 2008142687 A | 12/2006 |
| JP | 475004 A | 5/2007 |
| JP | 2017070937 A | 4/2017 |
| WO | 9402422 A1 | 2/1994 |
| WO | 2016020694 A1 | 2/2016 |

OTHER PUBLICATIONS

N. Remya, J.-G. Lin, Current status of microwave application in wastewater treatment—A review, Chem. Eng. J. 2011, 166, 797-813.

P.M. Mawioo, C.M. Hooijmans, H. A. Garcia, D.Brdjanovic, Microwave treatment of faecal sludge from intensively used toilets in the slums of Nairobi, Kenya, J. Environ. Manage. 2016, 184, 575-584.

V. K. Tyagi, S.-L. Lo, Microwave irradiation: A sustainable way for sludge treatment and resource recovery, Renew. Sust. Energ. Rev. 2013, 18, 288-305.

P. M. Mawioo, A. Rweyemamu, H. A. Garcia, C.M. Hooijmans, D. Brdjanovic, Evaluation of a microwave based reactor for the treatment of blackwater sludge, Sci. Total Environ. 2016, 548-549, 72-81.

Y. Sun, Y. Zhang, X. Quan, Treatment of petroleum refinery wastewater by microwave-assisted catalytic wet air oxidation under low temperature and low pressure, 2008, 62, 565-570.

Huiquan Wang et al. Review: Porous Metal Fibers and Membranes for Oil-Water Separation. Nanoscale Research Letters. 2018, 13, 284 (14 pages).

Yan Liu et al. A Facile Electrodeposition Process for the Fabrication of Superhydrophobic and Superoleophilic Copper Mesh for Efficient Oil-Water Separation. Industrial & Engineering Chemistry Research. 2016, 55(10), 2704-2712.

Colin R. Crick et al. Superhydrophobic polymer-coated copper-mesh; Membranes for highly efficient oil-water separation. J. Mater. Chem. A. 2013, 1, 5943-5948.

* cited by examiner

MICROWAVE BASED SYSTEMS FOR BACTERIA REMOVAL FROM WATER COOLING TOWERS

TECHNICAL FIELD

The present invention relates to elimination of bacteria from target locations and more particularly, to systems that utilize electromagnetic energy for bacteria elimination from cooling systems, such as water cooling tower systems that are used to cool down a heat exchanger in oil industry and it can be also extended to be used in the bacteria removal associated with crude oil.

BACKGROUND

In many ways, water is almost as important to the oil industry as oil itself. Indeed, the oil and gas industries consume a very large amount of water in their process from production to manufacturing. The amount of water needed to process every ton of petroleum was estimated to be 3 $m^3$. The major consumers of water in petroleum industries are cooling systems. Smaller portions of water are also utilized in boiling systems, production processes, fire protection and the rest in miscellaneous purposes. In the petroleum industry, liquid vapors are traditionally condensed to liquids in condensers, and coolers are employed to lower the temperature of liquid products to allow safe management. In all these units, water is the traditional cooling medium utilized. The water employed in cooling systems is usually recycled; therefore, water treatment is very critical in oil and gas industries. Even if the water is treated, the existence of bacteria is still a threat through the transportation process leading to the formation of biofilms. The presence and the deposition of bacteria in water and in the transmission system is a very serious matter that can lead to many issues such as scaling and corrosion within the systems.

The development of biofilms is produced by the biological activities of microorganisms. A biofilm consist of a thin layer of bacteria and other microorganisms sticking inside a surface of heat exchanger tubes or other similar structures. It is understood that a biofilm having a thickness 250 micrometer is sufficient to decrease the heat transfer coefficient owing to the lower thermal conductivity of the biofilms and microorganisms. Additionally, the accumulation of biofilms can lead to the damage of the heat exchanger tubes as the presence of bacteria in water increases its acidity by secreting acid by-product thus accelerating the corrosion rates. The formation of biofilms layers also increases the corrosion rates and the friction factor as the pumping required energy needed to circulate the cooling water increases in the presence of biofilms. The conventional way of fighting bacteria and controlling the growth of living organisms in the water cooling systems is usually attained using oxidizing and non-oxidizing biocides such as chlorine, hypochlorous acid or a hypochlorite ion. This process is effective to some extent, however it has its own drawbacks such as its high cost and the chemical compatibility between the biocides and the injected corrosion inhibitors. Moreover, optimizing the treatment dose of biocide is also a critical challenge as there is no available tool to monitor and maintain the accurate required treatment dose, a matter that make biocide resistance developed easily in addition to the acidity nature that could be created by using some types of biocides, e.g., carboxylic acid, that make them a corrosive agents. In addition to the environmental hazardous impact associated with using the biocides as some biocide formulation could contain a formaldehyde which is highly toxic and banned. Therefore, developing an alternative physical system to overcome all the above mentioned issue becomes essential.

SUMMARY

The present disclosure sets forth systems that utilize electromagnetic energy for bacteria elimination from cooling systems, such as water cooling tower systems that are used to cool down a heat exchanger in oil industry and it can be also extended to be used in the bacteria removal associated to crude oil.

In one implementation of the present disclosure, a device for treating a liquid for elimination of any bacteria that is present within the liquid includes an outer housing or casing having a first end and an opposing second end. An inlet is provided for receiving untreated liquid and an outlet for discharging liquid that has been treated and any bacteria has been eliminated. An inlet flow control mechanism is provided for controlling flow of the untreated liquid through the inlet and an outlet flow control mechanism is provided for controlling flow of the treated liquid through the outlet. A plurality of inner conduits are in fluid communication with the inlet and the outlet and a source of electromagnetic energy is disposed along a length of the inner conduits and configured to emit electromagnetic energy to the untreated liquid contained in the inner conduits for killing any bacteria that is present in the liquid to be treated.

In another implementation of the present disclosure, a device for treating a liquid for elimination of any bacteria that is present within the liquid includes an outer housing having a first end and an opposing second end. The device includes an inlet for receiving untreated liquid and an outlet for discharging liquid that has been treated and any bacteria has been eliminated. A main conduit that has a serpentine shape is provided and is in fluid communication with the inlet and the outlet. A flow control mechanism controls flow of the untreated liquid through the inlet and through the main conduit to the outlet. A source of electromagnetic energy is disposed along a portion of the main conduit and is configured to emit electromagnetic energy to the untreated liquid contained in the main conduit.

BRIEF DESCRIPTION OF THE DRAWING FIGURES

DETAILED DESCRIPTION OF CERTAIN EMBODIMENTS

As discussed herein, the present application discloses systems and methods for treating a liquid, e.g., water, for eliminating bacteria in a target setting in which the liquid is present, such as cooling systems. One exemplary cooling system comprises a water cooling tower system that can be used to cool down a heat exchanger in the oil industry or related field and it can be also extended to be used in the bacteria removal associated to crude oil. However, it will be appreciated that the systems disclosed herein are not limited to implementation only in the oil industry but instead can be implemented in any setting in which there is a desire or need for a liquid, such as water, to be bacteria free. For example, as will be readily understood, water cooling towers are also used in large residential settings, such as a high-rise buildings, and also commercial buildings. More specifically and as described herein, the present Applicant has discovered that employing electromagnetic energy (an electromagnetic field), e.g., microwave irradiation, in such systems results in the elimination of bacteria in the liquid that is being treated.

It will be understood that the system 100 is configured to broadly eliminate many different types of bacteria and microbes including but not limited to *Escherichia coli, Pseudomonas putida, Bacillus subtilis, Pseudomonas aeruginosa, Staphylococcus aureus, Enterococcus faecium*, Actinomycetes. It will be understood that the aforementioned listing of bacteria is not limiting of the scope of the present invention and is only exemplary of some bacteria that can be irradiated by application of the electromagnetic energy. In general, the types of bacteria that are typically found at the exemplary applications (e.g. water cooling tower system used in the oil industry) for discussed herein are eliminated by application of the electromagnetic energy.

As described herein, the systems can be of a closed nature in which a quantity of liquid to be treated is introduced into a liquid holding chamber where it is treated by being irradiated with electromagnetic energy. Alternately, the systems can be of an open nature in which the liquid continuous is introduced into and flows through and ultimately exits the system and there is an electromagnetic irradiation zone or region in which the liquid to be treated is irradiated with the electromagnetic energy (an electromagnetic field).

Closed System 100 for Electromagnetic Treatment of Liquid

Figure 1A:
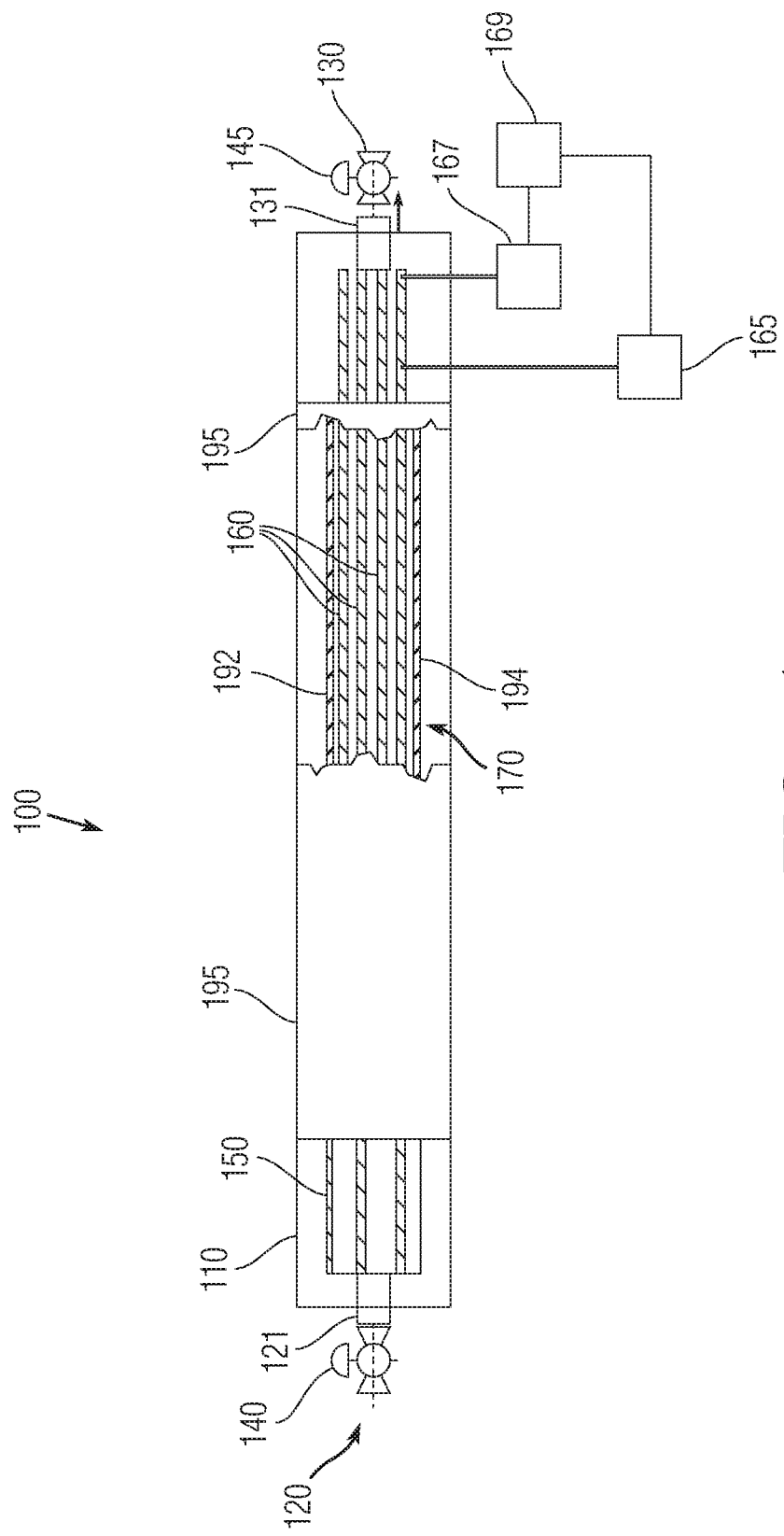
FIG. 1A is a perspective view of a closed reactor system that incorporates electromagnetic energy for bacteria elimination from a cooling system, such as a water cooling tower system.
Figure 1B:
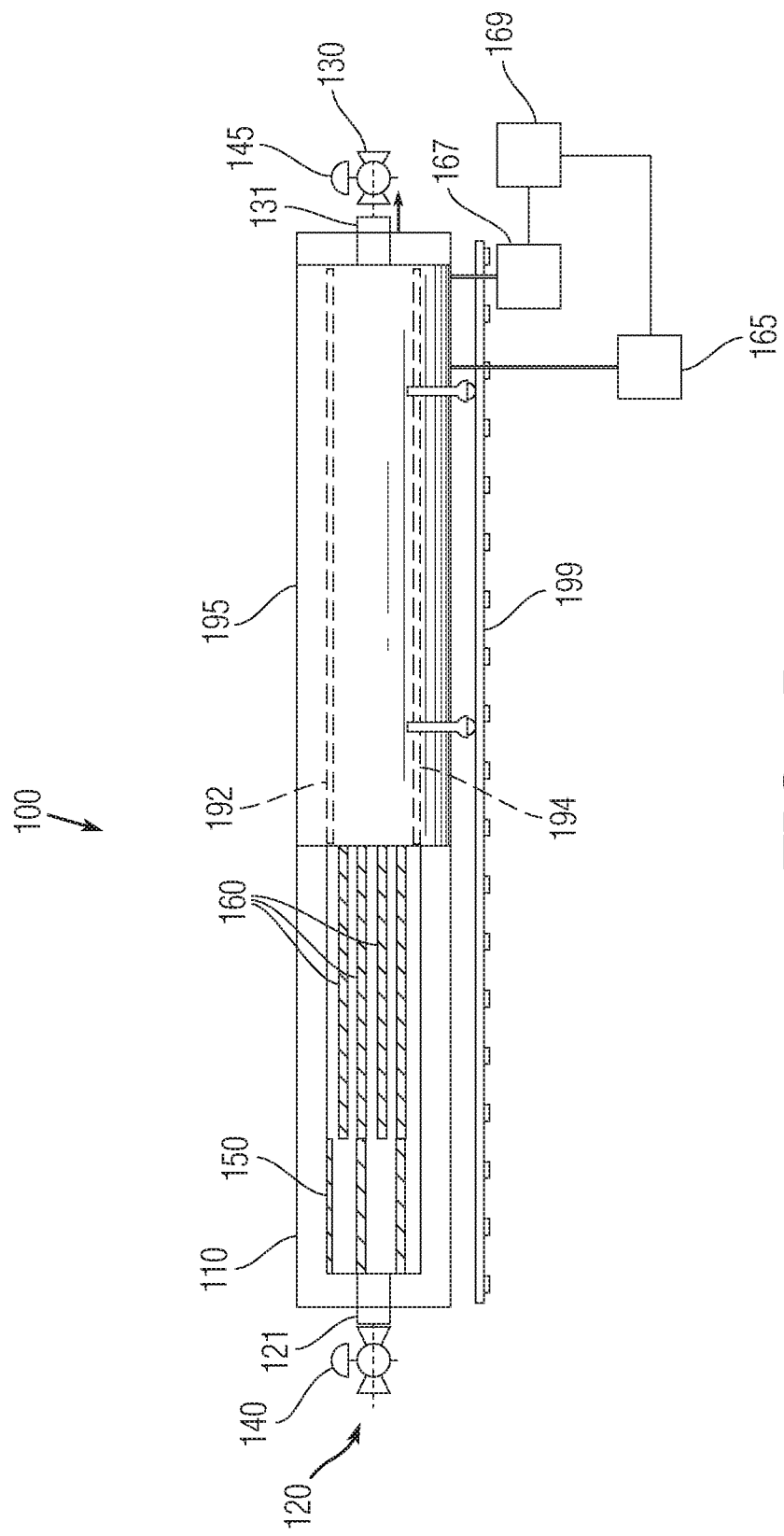
FIG. 1B is a perspective view of another closed reactor system that incorporates electromagnetic energy for bacteria elimination from a cooling system, such as a water cooling tower system.

FIGS. 1A and 1B are views of a system 100 in accordance with several implementations of the present application. It will be appreciated that as with the other systems described herein, the system 100 is configured to be operatively connected to a source of liquid to be treated. The source of liquid can take any number of different forms, including but not limited to, a conduit, such as a pipe or the like that carries the liquid to be treated; a tower or the like that holds the liquid to be treated; or any other arrangement in which a liquid to be treated either flows or is held for subsequent use.

The system 100 is a closed system in that, as described herein, a quantity of liquid to be treated, is introduced into the system 100 and is treated and is then discharged as a treated liquid before an additional quantity of untreated liquid is introduced into the system 100 for treatment. This process is repeated for each quantity of liquid and thus, can be thought of as being a batch type system in which batches of liquids are treated in series and succession.

As such, the system 100 has an inlet side and an opposing outlet side and as illustrated, each of the systems of FIGS. 1A and 1B has an elongated shape and is preferably oriented in a horizontal operating position relative to a reference surface, such as a ground surface. The system 100 has a first end which can function as an inlet end, and a second opposing end which can function as an outlet end. The system 100 is thus configured such that the first end is placed in fluid communication with the source of liquid to be treated (untreated liquid) and the second end acts as a discharge end in which treated liquid (bacteria free liquid) is discharged and flows along an outlet (discharge) flow path as by flowing through an outlet conduit (e.g. pipe).

The system has a main housing or casing 110 in which the working components of the system 100 are contained. The main housing 110 can have any number of different shapes, including but not limited to cylindrical, square, oval, oblong, triangular, rectangular, etc.

At the first end, the system 100 includes an inlet 120 which is configured to be placed in fluid communication with the source of liquid to be treated and can include an inlet pipe 121. The inlet 120 can be a tubular conduit, connector, nipple structure, etc. The inlet 120 is in fluid communication at the other end with the interior of the main housing 110. Similarly, at the second end, the system 100 includes an outlet 130 which is configured to be placed in fluid communication an outlet conduit or the like (not shown) for discharging and delivering the treated liquid from the system 100 to another location and can include an outlet pipe 121.

To control liquid flow within the inlet 120 there is a first flow regulator 140 which can be located along the inlet 120 external to the main housing 110. The first flow regulator 140 is configured to restrict (meter) or completely stop the flow of liquid through the inlet 120 into the main housing 110. Thus, the first flow regulator 140 can be positioned in a fully opened position to allow liquid to freely flow into the main housing 110 or in a fully closed position which prevents the liquid from flowing into the main housing 110. In addition, the first flow regulator 140 can be configured to assume an intermediate position between the fully closed position and the fully open position, whereby the flow rate of the liquid through the inlet 120 is controlled.

Similarly, to control liquid flow within the outlet 130 there is a second flow regulator 145 which can be located along the outlet 130 external to the main housing 110. The second flow regulator 145 is configured to restrict (meter) or completely stop the flow of liquid through the outlet 130. Thus, the second flow regulator 145 can be positioned in a fully opened position to allow liquid to freely flow from the main housing 110 or in a fully closed position which prevents the liquid from flowing out of the main housing 110. In addition, the second flow regulator 145 can be configured to assume an intermediate position between the fully closed position and the fully open position, whereby the flow rate of the liquid through the outlet 130 is controlled.

In accordance with one aspect, the system 100 can be constructed such that the fluid entering the main housing 110 is divided and directed into multiple internal flow paths. As such a fluid separator 150 can be provided and is located internally within the main housing 110 downstream of the inlet 120. The fluid separator's role is to receive the untreated liquid from the inlet 120 (single inlet flow path) and divide the liquid into multiple flow paths. The fluid separator 150 can be a header space that receives the liquid from the inlet 120 and is in fluid communication with a plurality of inner conduits 160 such that the untreated liquid flows into the plurality of inner conduits 160. The inner conduits 160 are thus hollow structures that are configured to carry the liquid from the inlet 120 to the outlet 130. The inner conduits 160 can be arranged parallel to one another with first ends proximate and in fluid communication with the inlet 120 and opposite second end being at and in fluid communication with the outlet 130. The arrangement of the inner conduits 160 can in one implementation be considered to be a bundle of conduits; however, other implementations are equally possible, such as arranging the inner conduits 160 into two or more sets of conduits. The two sets can be separated from one another. In any event, even if arranged in sets, the inner conduits 160 receive untreated liquid at one end and then discharge the treated liquid at the other end.

It will thus be understood that prior to the outlet 130, the inner conduits 160 are combined in that the liquid flowing within the inner conduits 160 is combined at or prior to the outlet 130 so that it is discharged through a single outlet 130. A header space similar to the fluid separator can be used to allow the liquid flowing within the inner conduits 160 to flow into a common space that is in fluid communication with or is part of the outlet 130.

The inner conduits 160 can be formed of any number of different suitable materials, including but not limited to, glass or a high temperature polymer, such as polyetheretherketone (PEEK), polyvinylidene fluoride or polyvinylidene difluoride (PVDF), polytetrafluoroethylene (PTFE), etc. or their composites wither used alone or reinforced with reinforcements such as particles, nanofiber, etc. The inner conduits 160 can be linear in shape.

It will be appreciated that the inner conduits 160 define the liquid treatment chamber since these inner conduits 160 are filled with untreated liquid and then the electromagnetic energy is applied to the untreated liquid contained within the inner conduits 160. The liquid volume defined by the inner conduits 160 thus defines the volume of liquid that can be treated during one cycle of treatment.

The main housing 110 also includes a source of electromagnetic energy (electromagnetic field) 170 that is contained within the main housing 110. Since the system 100 is a closed system, the system 100 is configured to be controllable and can be readily turned on and off depending upon the status of the liquid to be treated.

In one implementation, the electromagnetic energy comprises microwave energy and more particularly and according to at least one implementation, the untreated liquid is irradiated with microwave energy with wavelengths from about 1 mm to about 1 m and frequencies from about 0.3 to about 300 GHz in the electromagnetic spectrum.

As is known, microwaves are very short, high-frequency radio waves and the most common type of microwave-based device is a microwave oven that is found in most households. A microwave oven is in fact similar to a miniature broadcasting system since microwaves are the same types of energy as AM, FM, or CB radio, but the wavelength is much shorter for microwave. While these other types of radio waves broadcast over a distance, the microwave broadcasting system in the form of the microwave oven is self-contained. When the door is closed and the oven is turned on, a microwave transmitter, called a magnetron, sends a signal to a microwave receiver within the oven. The moment the door is opened, the magnetron (transmitter) stops broadcasting the microwaves and therefore, no energy is broadcasted (emitted) into the oven interior of the microwave while the door is open. The microwave receiver deflects the microwave energy into the metal-lined oven cavity, where it agitates the food molecules resulting in heating of the food. Since microwaves cannot penetrate metal, all the microwave energy remains inside the confines of the oven.

In FIGS. 1A and 1B, the source of electromagnetic energy 170 is in the form of a microwave device that includes a microwave sender (transmitter) 192 and a microwave receiver 194. Both the sender 192 and receiver 194 are within the interior (or could be located along the exterior) of the casing 110 and define the electromagnetic energy chamber and therefore, these two components 192, 194 surround the inner conduits 160. As described herein, FIG. 1A illustrates an embodiment in which the source of electromagnetic energy 170 is fixed relative to the inner conduits 160 and therefore, the source of electromagnetic energy 170 is disposed about a predetermined length of the inner conduits, such as along at least 50% of the length of the inner conduits 160, or at least 75% or in one embodiment, the source of electromagnetic energy 170 can completely cover the entire lengths of the inner conduits 160. As described herein, FIG. 1B illustrates an embodiment in which the source of electromagnetic energy 170 is movable relative to the inner conduits 160 and therefore, and any one point in time, the source 170 only covers and surrounds a prescribed length of the inner conduits 160, such as 25% or less of the length of the inner conduits 160, or 50% or greater.

In either embodiment, the sender 192 can be located along one side of the inner conduits 160 (and along the inner surface of the casing 110) and the receiver 194 can be located along an opposite side of the inner conduits 160 (and along the inner surface of the casing 110). Both the sender 192 and receiver 194 can have an elongated shape to allow position of each along the electromagnetic energy chamber. In other words, the lengths (dimensions) of the sender 192 and receiver 194 are preferably selected in view of the lengths (dimensions) of the inner conduits 160. In one implementation, the elongated sender 192 and receiver 194 have lengths that are equal to or greater than the lengths of the inner conduits 160. This ensures that the applied electromagnetic energy (electromagnetic field) irradiates all of the untreated liquid within the inner conduits 160. Alternatively, the sender 192 and receiver 194 can be discrete devices that have smaller dimensions relative to the inner conduits 160; however, they are configured such that the electromagnetic energy (microwave) is emitted such that its irradiation area is sufficient to treat all of the untreated liquid. As discussed herein, the objective of the present system 100 is to treat the liquid and eliminate any bacteria and microbes located therein by applying electromagnetic energy (e.g., microwaves) to the liquid.

It will also be understood that the microwave chamber can be of a type that is either fixed or movable and is at least partially defined by a microwave casing 195. The precise configuration can be selected to maximize microwave penetration into the untreated liquid. The microwave casing 195 can be a protective casing (sleeve or jacket) that surrounds the active parts of the microwave, namely, the sender 192 and receiver 194. In FIG. 1A, the casing (protective jacket) 195 is fixed, while, in FIG. 1B, the casing (protective jacket) 195 is movable (axially and/or rotationally).

In one embodiment shown in FIG. 1B, the microwave device that includes the microwave sender (transmitter) 192 and the microwave receiver 194 is movable along and relative to the inner conduits 160. For example, the microwave sender (transmitter) 192 and the microwave receiver 194 can move axially along the inner conduits 160 as by riding along an external rail(s) or guide(s) 199 or the like. Any number of conventional drive mechanisms, such as motorized system, can be used to axially drive the microwave sender (transmitter) 192 and the microwave receiver 194 along and surrounding the inner conduits 160 (e.g., along the longitudinal length of the inner conduits 160). It will also be appreciated that the axial movement can be in one or preferably two directions in that preferably, the microwave sender (transmitter) 192 and the microwave receiver 194 move in a back and forth axial manner (as by moving along the guide 199). Alternatively, the microwave sender (transmitter) 192 and the microwave receiver 194 can be configured to move in a circular manner about the inner conduits 160 (e.g., the microwave sender (transmitter) 192 and the microwave receiver 194 can rotate about the inner conduits 160—it will also be appreciated that two motions can be combined in that the microwave sender (transmitter) 192 and the microwave receiver 194 can both move axially and rotationally relative to the inner conduits 160). The above movements (e.g., axial and circular) are intended to maximize the penetration of the electromagnetic energy (waves) to the liquid to be treated.

In FIG. 1A, which is an exemplary fixed microwave embodiment, the fixed cover 195 and fixed sender 192 and fixed receiver 194 extend along the entire length of or at least substantially the entire length of the inner conduits 160. In this construction, once the inner conduits 160 are filled, the microwave source 170 is activated to irradiate the liquid within the inner conduits 160.

In FIG. 1B, the microwave source 170 moves, such as axial movement, relative to the inner conduits 160. Since the cover 195 is part of the microwave source 170, the microwave cover 195 along with the underlying sender 192 and receiver 194 move together as a unit along the outside of the inner conduits 160.

The present system and process is thus configured such that all of the bacteria and microbes are capsulated and killed during the electromagnetic energy treatment.

It will be readily understood that the inner conduits 160 are formed of a material that freely allows passage of electromagnetic energy through the inner conduits 160 so as to cause the irradiation of the untreated liquid with the electromagnetic energy (waves).

The device 100 can also include a volume sensor 165 that detects a volume of the liquid within the plurality of inner conduits 160 and a controller 169 that is coupled to the sensor 165 so that once the volume of liquid reaches a predetermined fill volume within the plurality of the inner conduits 160, the source of electromagnetic energy is automatically turned on. The predetermined value can be a volume between about 60% and about 85% of the total volume of the plurality of inner conduits 160.

In addition, the device 100 can have a temperature sensor 167 that monitors the temperature of the treated liquid within the plurality of inner conduits 160. The temperature sensor 167 is coupled to the controller 169 and the untreated liquid is heated to a predetermined threshold temperature that is one which is sufficient to ensure that any bacteria within the liquid is killed.

While not shown, the controller 169 is in communication with the first and second flow regulators 140, 145 for control thereof (e.g., allows control over operating states of the regulators).

It will be understood that the irradiation time of the electromagnetic energy is of a sufficient time to cause the elimination of bacteria within the inner conduits 160. Thus, this calculation is based at least in part on the total volume of the liquid that is contained within the inner conduits 160 as well as the target type of bacteria and the dimensions of the inner conduits 160 as well as other factors. In one exemplary implementation, the irradiation time is between about 10 seconds and about 60 seconds; more particularly, between about 40 seconds and about 100 seconds; and alternatively, between about 100 seconds and about 300 seconds. It will be appreciated that the aforementioned values are only exemplary and not limiting of the present invention and therefore, other irradiation times are equally possible.

Treatment of Liquid with the System 100

It will be readily understood that in order to treat the liquid, the first flow regulator 140 is opened and the second flow regulator 145 is closed to allow filling of the liquid treatment chamber defined by the inner conduits 160. Once the inner conduits 160 are filled to a desired volume (using the volume sensor 165), the first flow regulator 140 can be closed, thereby isolating the liquid to be treated within the inner conduits 160. The electromagnetic energy treatment (microwave irradiation) is initiated and electromagnetic waves are emitted from the transmitter 192 and are received at the receiver 194. In one implementation, the electromagnetic energy treatment is automatically initiated when the first flow regulator 140 is closed (and optionally when the volume sensor 165 detects the threshold volume of the liquid). The emitted electromagnetic waves (microwaves) pass through the inner conduits 160 and thus, pass through the untreated liquid contained therein. This irradiation step results in treatment of the liquid contained within the inner conduits 160 and more particularly, results in elimination of any bacteria that is contained within the liquid to be treated that is contained within the inner conduits 160. Once the liquid contained and captured within the electromagnetic energy chamber (inner conduits 160) is treated with the electromagnetic energy (microwaves), the second flow regulator 145 is opened (with the first flow regulator 140 still being closed) to allow the treated liquid to be discharged from the inner conduits 160. Any number of techniques can be used to discharge the liquid from the inner conduits 160. For example, negative pressure (suction) can be applied to the treated liquid for drawing it out of the inner conduits 160. Also, the system 100 can be programmed such that the opening of the second flow regulator 145 automatically stops the electromagnetic energy treatment.

Once the treated liquid has been discharged from the inner conduits 160 (the electromagnetic energy chamber), the second flow regulator 145 is closed and the first flow regulator 140 is opened to allow new untreated liquid to flow into the inner conduits 160 for filling thereof. Once the inner conduits 160 are filled again, then the treatment process is repeated as by closing the first flow regulator 140 and then operating the electromagnetic energy source (microwave).

The treated fluid can then be released to a cooling system (or other application) before it will be used as part of a further industrial process.

Continuous System 200 for Electromagnetic Treatment of Liquid

Figure 2:
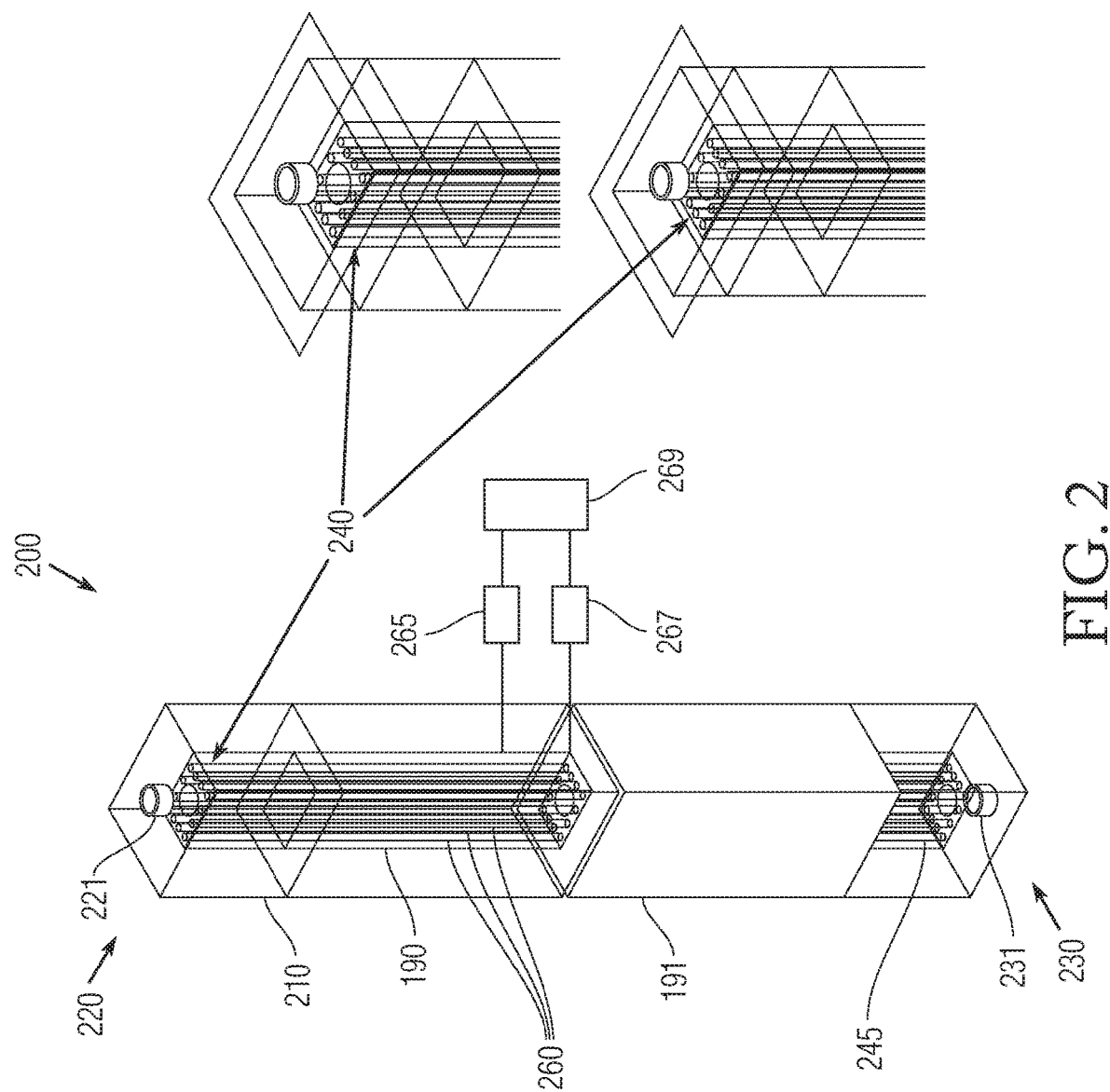
FIG. 2 is a perspective view of a vertical or horizontally oriented continuous (open) reactor system that incorporates electromagnetic energy for bacteria elimination from a cooling system, such as a water cooling tower system.

FIG. 2 illustrates another system 200 that is similar to system 100 and is configured to treat and eliminate bacteria in liquid, such as water that is held in a water cooling tower.

FIG. 2 is thus a view of the system 200 in accordance with another implementation of the present application. It will be appreciated that as with the other systems described herein, the system 200 is configured to be operatively connected to a source of liquid to be treated. The source of liquid can take any number of different forms, including but not limited to, a conduit, such as a pipe or the like that carries the liquid to be treated; a tower or the like that holds the liquid to be treated; or any other arrangement in which a liquid to be treated either flows or is held for subsequent use.

Unlike the system 100 of FIGS. 1A and 1B, the system 200 is an open (continuous) system in that, as described herein, a stream of liquid to be treated, is introduced into the system 200 and flows within an electromagnetic energy chamber that is part of the system 200. As the stream of liquid continuously flows within the electromagnetic energy chamber, it is subjected to electromagnetic energy, and any bacteria or microbes present in the liquid are capsulated and killed during the electromagnetic energy treatment. As described herein, the residence time of the liquid to be treated is controlled by equipment such as flow control regulators (valves) and the like. The residence time is of a sufficient time for all of the bacteria and microbes to be eliminated prior to the liquid being discharged from the system 200 and in particular, the electromagnetic energy chamber.

The system 200 has an inlet side and an opposing outlet side and as illustrated, the system of FIG. 2 has an elongated shape and can be oriented in either a vertical or horizontal operating position relative to a reference surface, such as a ground surface. The system 200 has a first end which can function as an inlet end, and a second opposing end which can function as an outlet end. The system 200 is thus configured such that the first end is placed in fluid communication with the source of liquid to be treated (untreated liquid) and the second end acts as a discharge end in which treated liquid (bacteria free liquid) is discharged and flows along an outlet (discharge) flow path as by flowing through an outlet conduit (e.g. pipe).

The system has a main housing or casing 210 in which the working components of the system 200 are contained. The main housing 210 can have any number of different shapes, including but not limited to cylindrical, square, oval, oblong, triangular, rectangular, etc.

At the first end, the system 200 includes an inlet 220 which is configured to be placed in fluid communication with the source of liquid to be treated and can include an inlet pipe 221. The inlet 220 can be a tubular conduit, connector, nipple structure, etc. The inlet 220 is in fluid communication at the other end with the interior of the main housing 210. Similarly, at the second end, the system 200 includes an outlet 230 which is configured to be placed in fluid communication an outlet conduit or the like (not shown) for discharging and delivering the treated liquid from the system 200 to another location and can include an outlet pipe 231.

To control liquid flow within the inlet 220 there is a first flow regulator 240 which can be located along the inlet 220 external to the main housing 110. The first flow regulator 240 is configured to restrict (meter) or completely stop the flow of liquid through the inlet 220 into the main housing 210. Thus, the first flow regulator 240 can be positioned in a fully opened position to allow liquid to freely flow into the main housing 210 or in a fully closed position which prevents the liquid from flowing into the main housing 210. In addition, the first flow regulator 240 can be configured to assume an intermediate position between the fully closed position and the fully open position, whereby the flow rate of the liquid through the inlet 220 is controlled.

It will be understood that any number of different types of flow regulators can be used. In one implementation, the first flow regulator 240 can be in the form of a first diaphragm valve that acts to control and regulate the flow rate of the untreated liquid that is flowing into the main housing 210 and thus acts as a fluid intake rate controller.

As is known, a diaphragm valve (or membrane valve) consists of a valve body with two or more ports, an elastomeric diaphragm and a "weir or saddle" or seat upon which the diaphragm closes the valve. The valve body can be formed of any number of types of materials, including metal or plastic is in in fluid communication with the source of untreated liquid. There are two main categories of diaphragm valves; namely, one type of diaphragm valve that seals over a "weir" (saddle) and the other (sometimes called a "full bore or straight-through" valve) seals over a seat.

Diaphragm valves can also be manual or automated. Automated diaphragm valves may use pneumatic, hydraulic or electric actuators along with accessories such as solenoid valves, limit switches and positioners.

Similarly, to control liquid flow within the outlet 230 there is a second flow regulator 245 which can be located along the outlet 230 external to the main housing 210. The second flow regulator 245 is configured to restrict (meter) or completely stop the flow of liquid through the outlet 230. Thus, the second flow regulator 245 can be positioned in a fully opened position to allow liquid to freely flow from the main housing 210 or in a fully closed position which prevents the liquid from flowing out of the main housing 210. In addition, the second flow regulator 245 can be configured to assume an intermediate position between the fully closed position and the fully open position, whereby the flow rate of the liquid through the outlet 230 is controlled.

The second flow regulator 245 can also be in the form of a second diaphragm valve that can have the same type of construction as the first diaphragm valve. Since the second diaphragm valve is located downstream of the electromagnetic energy chamber, treated liquid flows through the second flow regulator 245. As discussed herein, the use of adjustable diaphragm valves 240, 245 allows the flow rate of the liquid to be treated to be controlled to allow sufficient residence time for the continuously flowing liquid within the electromagnetic energy chamber.

In accordance with one aspect, the system 200, like the system 100, can be constructed such that the fluid entering the main housing 210 is divided and directed into multiple internal flow paths that flow within the electromagnetic energy chamber. As such a fluid separator (e.g., separator 150 or similar thereto) can be provided and is located internally within the main housing 210 downstream of the inlet 220. The fluid separator's role is to receive the untreated liquid from the inlet 220 (single inlet flow path) and divide the liquid into multiple flow paths so as to provide increased surface area within the electromagnetic energy chamber. The fluid separator can be a header space that receives the liquid from the inlet 220 and is in fluid communication with a plurality of inner conduits 260 such that the untreated liquid flows into the plurality of inner conduits 260. The inner conduits 260, can be the same as inner conduits 160, and thus can be in the form of hollow structures that are configured to carry the liquid from the inlet 220 toward the outlet 230. The inner conduits 260 can be arranged parallel to one another with first ends proximate and in fluid communication with the inlet 220 and opposite second end being at and in fluid communication with the outlet 230. The arrangement of the inner conduits 260 can in one implementation be considered to be a bundle of conduits; however, other implementations are equally possible, such as arranging the inner conduits 260 into two or more sets of conduits. The two sets can be separated from one another. In any event, even if arranged in sets, the inner conduits 260 receive untreated liquid at one end and then discharge the treated liquid at the other end.

The inner conduits 260 can be formed of any number of different suitable materials, including but not limited to, glass or a high temperature polymer, such as polyetheretherketone (PEEK), polyvinylidene fluoride or polyvinylidene difluoride (PVDF), polytetrafluoroethylene (PTFE), etc., or their composites wither used alone or reinforced with reinforcements such as particles, nanofiber, etc. The inner conduits 260 can be linear in shape.

It will be appreciated that the inner conduits 260 define the liquid treatment chamber since these inner conduits 260 are filled with untreated liquid and then the electromagnetic energy is applied to the untreated liquid contained within the inner conduits 260 as part of an electromagnetic energy chamber which can be the same as the liquid treatment chamber.

The inner conduits 260 thus define the multiple flow paths in which the liquid flows and is exposed to the electromagnetic energy. Much like a heat exchanger/radiator with plural fins, the provision of the inner conduits 260 increases the surface area of liquid that is exposed to the electromagnetic energy, thereby maximizing the treatment efficacy.

The main housing 210 also includes a source of electromagnetic energy (electromagnetic field) that is contained within the main housing 110. Evan though the system 200 is an open (continuous) system, the system 200 is configured to be controllable and can be readily turned on and off depending upon the status of the liquid to be treated. The source of electromagnetic energy in system 200 can be the same as in the system 100 in that it is preferably microwave energy.

According to at least one implementation, the untreated liquid is irradiated with microwave energy with wavelengths from about 1 mm to about 1 m and frequencies from about 0.3 to about 300 GHz in the electromagnetic spectrum.

In FIG. 2, the source of electromagnetic energy is in the form of a microwave device that includes a microwave sender (transmitter) and a microwave receiver with a chamber 190. The microwave sender and receiver can be in the form of the components 192, 194 shown earlier. Both the sender and receiver are within the interior of the casing and define the electromagnetic energy chamber 190 and therefore, these two components surround the inner conduits 260. More particularly, the sender can be located along one side of the inner conduits 260 (and along the inner surface of the casing 110) and the receiver can be located along an opposite side of the inner conduits 260 (and along the inner surface of the casing 110). Both the sender and receiver can have an elongated shape to allow position of each along the electromagnetic energy chamber. In other words, the lengths (dimensions) of the sender and receiver are preferably selected in view of the lengths (dimensions) of the inner conduits 260. In one implementation, the elongated sender and receiver have lengths that are equal to or greater than the lengths of the inner conduits 260. This ensures that the applied electromagnetic energy (electromagnetic field) irradiates all of the untreated liquid within the inner conduits 260. Alternatively, the sender and receiver can be discrete devices that have smaller dimensions relative to the inner conduits 260; however, they are configured such that the electromagnetic energy (microwave) is emitted such that its irradiation area is sufficient to treat all of the untreated liquid. As discussed herein, the objective of the present system 100 is to treat the liquid and eliminate any bacteria and microbes located therein by applying electromagnetic energy (e.g., microwaves) to the liquid.

A protective casing (housing) 191 can be provided in the microwave energy chamber 190 region. The protective casing 191 can surround at least the microwave transmitter and receiver.

The present system and process is thus configured such that all of the bacteria and microbes are capsulated and killed during the electromagnetic energy treatment.

It will be readily understood that the inner conduits 260 are formed of a material that freely allows passage of electromagnetic energy through the inner conduits 260 so as to cause the irradiation of the untreated liquid with the electromagnetic energy (waves).

It will be understood that the irradiation time of the electromagnetic energy is of a sufficient time to cause the elimination of bacteria within the inner conduits 260.

Thus, this calculation is based at least in part on the total volume of the liquid that is contained within the inner conduits 260 within the electromagnetic energy chamber as well as the flowrate of the liquid within the inner conduits 260 and even the target type of bacteria and the dimensions of the inner conduits 260 as well as other factors. In one exemplary implementation, the irradiation time is between about 10 seconds and about 60; more particularly, between about 40 seconds and about 100 seconds; and alternatively, between about 100 seconds and about 300 seconds. It will be appreciated that the aforementioned values are only exemplary and not limiting of the present invention and therefore, other irradiation times are equally possible.

Since the system 200 is an open system, the flowrate of the liquid is critical and is controlled by the position and operation of the first and second diaphragm valves. By controlling the first and second diaphragm valves, the flowrate of the liquid is controlled and residence time of the liquid within the electromagnetic energy chamber is carefully controlled to ensure that the liquid within the inner conduit 260 is exposed sufficiently to the electromagnetic energy (microwaves).

It will be appreciated that the system 200 can be positioned in a vertical orientation or in a horizontal orientation. Moreover, as with the other systems, additional equipment, such as pumps and the like, can be used to pump the liquid to be treated through the system 200. Thus, pump speed and the like can be used to control the flow of the liquid through the system 200 and control the residence time of the liquid within the electromagnetic energy chamber.

The device 200 can also include a volume sensor 265 that detects a volume of the liquid within the plurality of inner conduits 260 and a controller 269 that is coupled to the sensor 265 so that once the volume of liquid reaches a predetermined fill volume within the plurality of the inner conduits 260, the source of electromagnetic energy is automatically turned on. The predetermined value can be a volume between about 60% and about 85% of the total volume of the plurality of inner conduits 260.

In addition, the device 200 can have a temperature sensor 267 that monitors the temperature of the treated liquid within the plurality of inner conduits 160. The temperature sensor 267 is coupled to the controller 269 and the untreated liquid is heated to a predetermined threshold temperature that is one which is sufficient to ensure that any bacteria within the liquid is killed.

Operation of the System 200

The system 200 is operated by setting the first and second diaphragm valves 240, 245 at desired settings and then the system is operated to deliver the untreated liquid to the inlet 220 and subsequently into the inner conduits 260 where the liquid is irradiated by the electromagnetic energy. As mentioned, the system 200 is an open system in which the liquid continuously flows. The residence time is sufficient to eliminate any bacteria and microbes in the liquid and then the treated liquid is discharged through the outlet 230. The use of temperature sensor 267 ensures that the liquid is heated to a sufficiently high temperature to ensure that all of the bacteria is eliminated (killed).

Continuous (Open) System 300 for Electromagnetic Treatment of Liquid

Figure 3:
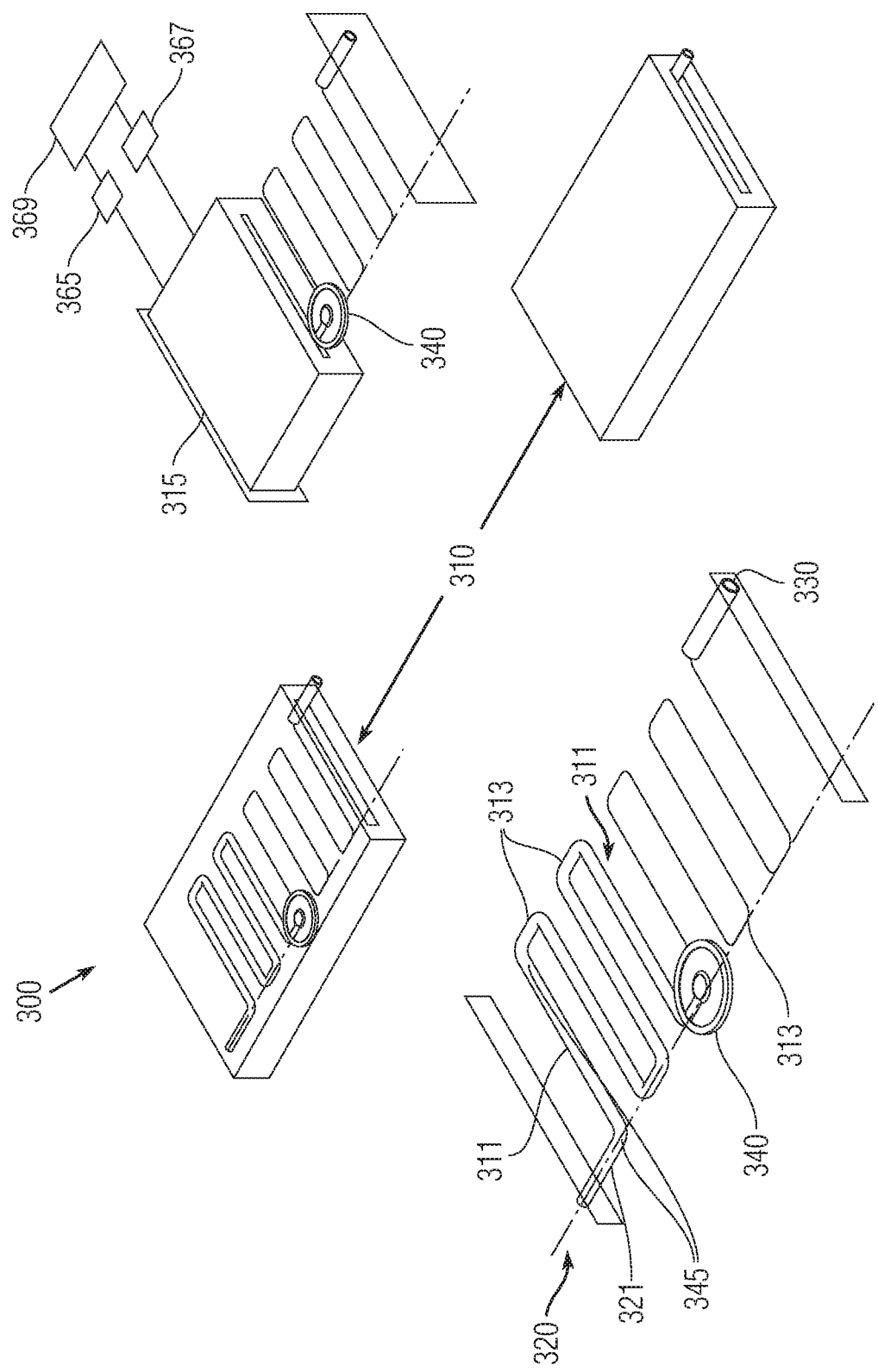
FIG. 3 is a perspective view of a vertical or horizontally oriented continuous (open) reactor system that incorporates electromagnetic energy for bacteria elimination from a cooling system, such as a water cooling tower system.

FIG. 3 illustrates another system 300 that is similar to the systems 100, 200 and is configured to treat and eliminate bacteria in liquid, such as water that is held in a water cooling tower.

FIG. 3 is thus a view of the system 300 in accordance with another implementation of the present application. It will be appreciated that as with the other systems described herein, the system 300 is configured to be operatively connected to a source of liquid to be treated. The source of liquid can take any number of different forms, including but not limited to, a conduit, such as a pipe or the like that carries the liquid to be treated; a tower or the like that holds the liquid to be treated; or any other arrangement in which a liquid to be treated either flows or is held for subsequent use.

Like the system 200 of FIG. 2, the system 300 is an open (continuous) system in that, as described herein, a stream of liquid to be treated, is introduced into the system 300 and flows within an electromagnetic energy chamber that is part of the system 300. As the stream of liquid continuously flows within the electromagnetic energy chamber, it is subjected to electromagnetic energy, and any bacteria or microbes present in the liquid are capsulated and killed during the electromagnetic energy treatment. As described herein, the residence time of the liquid to be treated is controlled by equipment such as flow control regulators (valves) and the like. The residence time is of a sufficient time for all of the bacteria and microbes to be eliminated prior to the liquid being discharged from the system 300 and in particular, the electromagnetic energy chamber.

The system 300 has an inlet side and an opposing outlet side and as illustrated, the system of FIG. 3 has an elongated shape and can be oriented in either a vertical or horizontal operating position relative to a reference surface, such as a ground surface. The system 300 has a first end which can function as an inlet end, and a second opposing end which can function as an outlet end. The system 300 is thus configured such that the first end is placed in fluid communication with the source of liquid to be treated (untreated liquid) and the second end acts as a discharge end in which treated liquid (bacteria free liquid) is discharged and flows along an outlet (discharge) flow path as by flowing through an outlet conduit (e.g. pipe). As with the other systems, the system 300 can be thought of has being a system loop tubing reactor.

The system has a main housing or casing 310 (a reactor) in which the working components of the system 300 are contained. The main housing 310 can have any number of different shapes, including but not limited to cylindrical, square, oval, oblong, triangular, rectangular, etc.

At the first end, the system 300 includes an inlet 320 which is configured to be placed in fluid communication with the source of liquid to be treated and can include an inlet pipe 321. The inlet 320 can be a tubular conduit, connector, nipple structure, etc. The inlet 320 is in fluid communication at the other end with the interior of the main housing (reactor) 310. Similarly, at the second end, the system 300 includes an outlet 330 which is configured to be placed in fluid communication an outlet conduit or the like (not shown) for discharging and delivering the treated liquid from the system 300 to another location and can be in the form of a pipe.

Unlike the other systems, the rate of liquid intake in the system 300 is controlled by a first flow control device which can be in the form of a main reverse mini turbine or impeller 340 which is located along the main flow path of the reactor 310 and acts as a fluid decelerator and controller. As is known, a turbine pump (impeller) is a type of centrifugal pump. The difference is that most pumps referred to as centrifugal have impeller vanes that accelerate liquids in a radial direction from the rotating shaft. Turbine pumps accelerate liquids more toward the axis of the rotating shaft of the pump. In the present system 300, the opposite is true in that the turbine (impeller) is of a reverse nature and causes a deceleration of the liquid since it desired to cause the liquid to assume a certain residence time within the reactor 310 so that the liquid is sufficiently treated with electromagnetic energy.

As shown in FIG. 3, the main flow path has a serpentine shape in that the reactor 310 includes a plurality of main conduits 311 that are arranged parallel to one another with a series of end conduits 313 connecting the ends of the main conduits 311, thereby forming a continuous flow path (e.g., continuous tubular structure). These end conduits 313 can also be parallel to another and are oriented perpendicular to the main conduits 311. The result is a serpentine shaped flow path defined by a serpentine shaped layout of the conduits 311, 313. It will further be appreciated that the main flow path has different zones or regions defined by sets of the conduits 311, 313. For example, one set of conduits 311, 313 (with a serpentine shape) can define the liquid treatment or electromagnetic energy chamber in which the liquid flowing within this zone is treated with electromagnetic energy. Another set of conduits 311, 313 can lie downstream of the electromagnetic energy chamber and is an area in which the liquid flows according to the serpentine pattern before exiting through the outlet.

It will be appreciated that the conduits 311, 313 can define a single flow path or for each conduit segment 311 there can be a bundle of conduits and for each conduit segment 313 there can be a bundle of conduits.

At the intersection of one main conduit 311 and one end conduit 313, there can be a secondary reverse impeller 345 (fluid decelerator part) that like the main impeller 340 functions to decelerator the flow of the liquid within the reactor 310 (i.e., within the conduits 311, 313). This location is at a location at which the liquid is about to reverse its flow direction and flow back at an opposite direction in another one of the main conduits 311.

It will therefore be appreciated that the controlled operation of the main impeller 340 and the one or more secondary impellers 345 is used to control the flow rate of the liquid within the reactor 310 and more particularly, to control the residence time of the liquid within the electromagnetic energy chamber.

It will also be appreciated that the secondary impellers 345 can in one implementation be only located within the electromagnetic energy chamber portion of main casing 310 since it is more important to control the flow of the liquid within this region (zone) in which the liquid is irradiated with electromagnetic energy.

The conduits 311, 313 can be formed of any number of different suitable materials, including but not limited to, glass or a high temperature polymer, such as polyetheretherketone (PEEK), polyvinylidene fluoride or polyvinylidene difluoride (PVDF), polytetrafluoroethylene (PTFE), etc., or their composites wither used alone or reinforced with reinforcements such as particles, nanofiber, etc.

The main housing 310 also includes a source of electromagnetic energy (electromagnetic field) that is contained within the main housing 310. Evan though the system 300 is an open (continuous) system, the system 300 is configured to be controllable and can be readily turned on and off depending upon the status of the liquid to be treated. The source of electromagnetic energy in system 300 can be the same as in the system 300 in that it is preferably microwave energy.

According to at least one implementation, the untreated liquid is irradiated with microwave energy with wavelengths from about 1 mm to about 1 m and frequencies from about 0.3 to about 300 GHz in the electromagnetic spectrum.

In FIG. 3, the source of electromagnetic energy is in the form of a microwave device that includes a microwave sender (transmitter) and a microwave receiver (which can the same or similar to the components 192, 194) that are located within a chamber 315. Both the sender and receiver are within the interior of the casing and define the electromagnetic energy chamber and therefore, these two components surround the conduits 311, 313 within the electromagnetic energy chamber (zone). More particularly, the sender can be located along one side of the conduits 311, 313 (and along the inner surface of the casing 310) and the receiver can be located along an opposite side of the conduits 311, 313 (and along the inner surface of the casing 310). Both the sender and receiver can have an elongated shape to allow position of each along the electromagnetic energy chamber. In other words, the lengths (dimensions) of the sender and receiver are preferably selected in view of the lengths (dimensions) of the inner conduits 311, 313 within the electromagnetic energy chamber (zone). The sender and receiver are configured to provide sufficient coverage of the electromagnetic energy chamber for irradiating the liquid flowing within such zone. This ensures that the applied electromagnetic energy (electromagnetic field) irradiates all of the liquid within the conduits 311, 313 at least within the electromagnetic energy chamber (zone) 315.

As discussed herein, the objective of the present system 300 is to treat the liquid and eliminate any bacteria and microbes located therein by applying electromagnetic energy (e.g., microwaves) to the liquid.

The present system and process is thus configured such that all of the bacteria and microbes are capsulated and killed during the electromagnetic energy treatment.

It will be readily understood that the conduits 311, 313 are formed of a material that freely allows passage of electromagnetic energy through the conduits 311, 313 so as to cause the irradiation of the untreated liquid with the electromagnetic energy (waves).

It will be understood that the irradiation time of the electromagnetic energy is of a sufficient time to cause the elimination of bacteria within the conduits 311, 313 within the electromagnetic energy chamber.

Thus, this calculation is based at least in part on the total volume of the liquid that is contained within the electromagnetic energy chamber as well as the flowrate of the liquid within the conduits 311, 313 and even the target type of bacteria and the dimensions of the conduits 311, 313 as well as other factors. In one exemplary implementation, the irradiation time is between about 10 seconds and about 60; more particularly, between about 40 seconds and about 100 seconds; and alternatively, between about 100 seconds and about 300 seconds. It will be appreciated that the aforementioned values are only exemplary and not limiting of the present invention and therefore, other irradiation times are equally possible. Exemplary flow rate of the liquids within the electromagnetic energy chamber can be between about $6.33*10^{-4}$ m$^3$/s and 0.0101 m$^3$/s and more specifically, between $1.266*10^{-3}$ m$^3$/s and 0.0202 m$^3$/s.

The device 300 can also include a volume sensor 365 that detects a volume of the liquid within the plurality of inner conduits 360 and a controller 369 that is coupled to the sensor 365 so that once the volume of liquid reaches a predetermined fill volume within the plurality of the inner conduits 360, the source of electromagnetic energy is automatically turned on. The predetermined value can be a volume between about 60% and about 85% of the total volume of the plurality of inner conduits 360.

In addition, the device 300 can have a temperature sensor 367 that monitors the temperature of the treated liquid within the plurality of inner conduits 360. The temperature sensor 367 is coupled to the controller 369 and the untreated liquid is heated to a predetermined threshold temperature that is one which is sufficient to ensure that any bacteria within the liquid is killed.

Since the system 300 is an open system, the flowrate of the liquid is critical and is controlled by the position and operation of the first and second diaphragm valves. By controlling the first and second diaphragm valves, the flowrate of the liquid is controlled and residence time of the liquid within the electromagnetic energy chamber is carefully controlled to ensure that the liquid within the conduits 311, 313 is exposed sufficiently to the electromagnetic energy (microwaves).

It will be appreciated that the system 300 can be positioned in a vertical orientation or in a horizontal orientation. Moreover, as with the other systems, additional equipment, such as pumps and the like, can be used to pump the liquid to be treated through the system 300. Thus, pump speed and the like can be used to control the flow of the liquid through the system 300 and control the residence time of the liquid within the electromagnetic energy chamber.

In one implementation the source of electromagnetic energy is fixed in that it is of a non-movable construction and is fixed within the main casing 310 (and electromagnetic energy chamber thereof) and is thus fixed relative to the conduits 311, 313. The serpentine configuration of the conduits 311, 313 is also selected to maximize electromagnetic (microwave) penetration into the liquid. The treatment process takes a certain time to complete while all bacteria (and any microbes) are capsulated and killed during this period.

Finally, the main impeller 340 works as an agent to reduce the fluid releasing rate from the system 300 in order to assure that the liquid has been exposed to electromagnetic (microwave) radiation and heated to the required temperature. Once this process is completed, the liquid will be released to the cooling system before it will be used into further industrial processes. The system 300 is a continuous system that can be setup either vertically or horizontally, with the flow rate of the fluid being controlled by the use of pumps (impellers) that are provided along the main flow path of the fluid.

As shown, a common housing can surround the surround the different regions of the system 300.

Operation of the System 300

The main reverse impeller and any secondary reverse impeller are set to prescribed operation states to allow flow of liquid into the main conduit. Once the liquid within the conduits 311, 313 within the electromagnetic energy chamber reaches a preset value (preset filling level), the electromagnetic energy is activated and delivered to the electromagnetic chamber for irradiating the liquid to eliminate any bacteria and/or microbes. Temperature of the treated liquid can also be monitored with a sensor or the like.

Plural Systems

Figure 4:
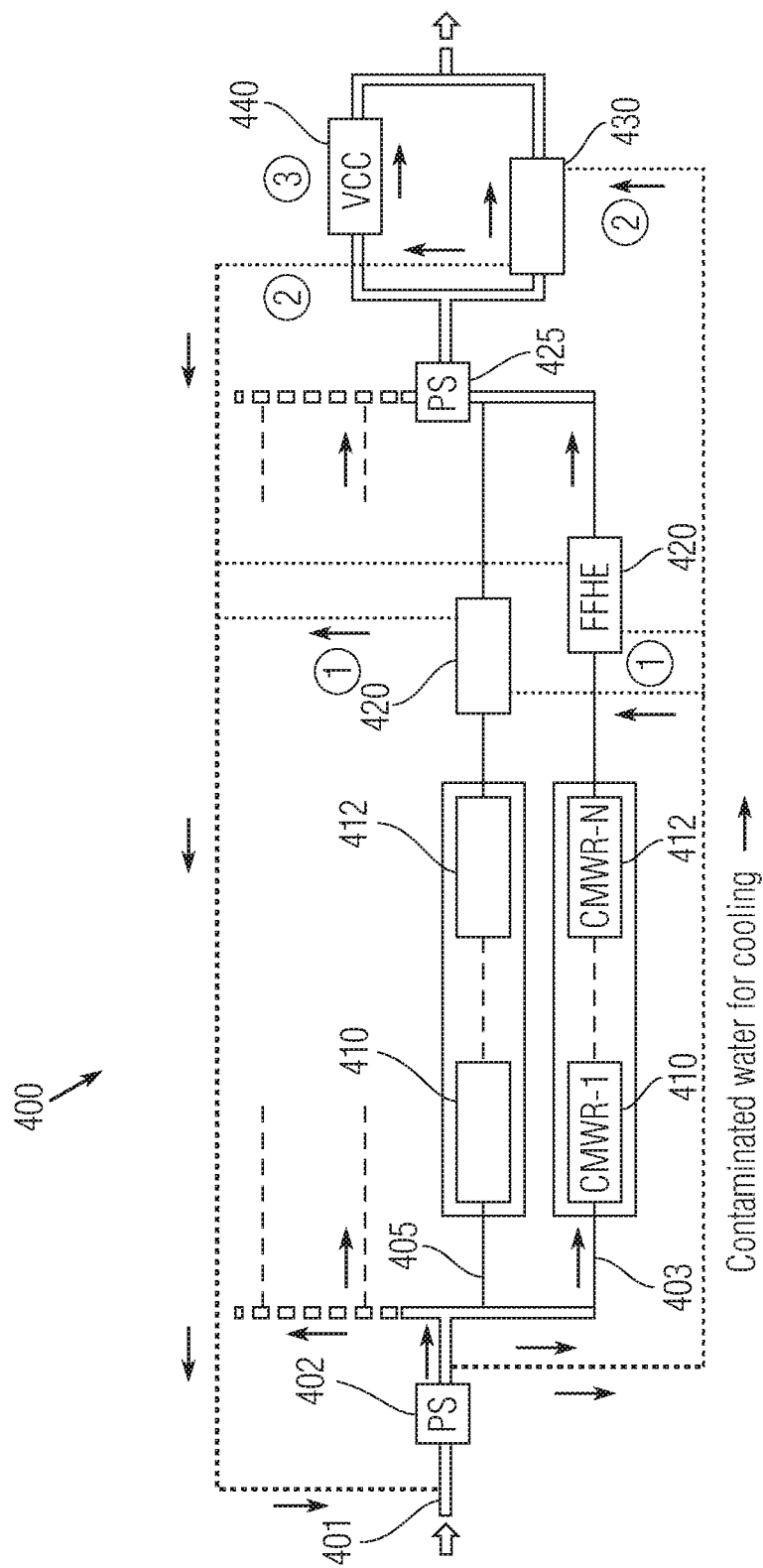
FIG. 4 is a schematic of several exemplary microwave systems combined with cooling systems.

As shown in FIG. 4, in order to maximize the bacteria elimination and decrease the water flow, several electromagnetic energy (microwave) systems can be configured in a parallel orientation.

FIG. 4 shows an exemplary system 400 in which plural microwave systems are combined with one or more cooling systems. The system 400 includes a main inlet conduit 401 that leads to a splitter 402 that channels the liquid from the main inlet conduit 402 into many different parallel flow paths. For ease of simplicity, a first parallel flow path 403 is shown, as well as second parallel flow path 405 is shown; however, it will be understood and as partially shown, additional parallel flow paths can be provided. Along each parallel flow path 403, 405, there is one or more, and preferably a plurality of continuous microwave reactors (CMWR) (such as one of device 200, 300). For example, FIG. 4 shows a first CMWR 410 and a second CMWR 412 that is located downstream of the first CMWR 410. Downstream of the CMWRs, there is a fluid to fluid heat exchanger (FFHE) 420 (along each of the flow paths 403, 405). The FFHEs 420 are for post cooling of the treated liquid that is discharged from the CMWRs 410, 412.

Downstream of the FFHEs 420, all of the flow paths 403, 405 are recombined at a fluid collector space 425. The FFHEs 420 thus represent cooling of the liquid downstream of the CMWRs 410, 412 but upstream of the collector space 425.

Post-cooling of the liquid downstream of the CMWRs 410, 412 and also downstream of the collector space 425 can also be accomplished using either: (1) a single cooling system (FFHE) 430 placed after (downstream) of the collector space 425 or (2) a single cooling VCC system 440 placed after (downstream) of the collector space 425.

FIG. 4 thus illustrates an arrangement that is configured to maximize the bacteria elimination and decrease the water flow, several microwave (electromagnetic energy) systems can be configured in parallel. This can be achieved by: (1) reducing the pipes diameter to fit into the microwave reactor, by using a n-Ways 'Pipe Splitter (PS)' with n=number of lines=((Initial pipe diameter/microwave reactor diameter limit)+X). The 'x' is the number of extra lines for maintenance and cooling purposes, (2) splitting the pipeline entering a microwave reactor into several parallel helical tubes, that could be designed in a multitude of possible configurations, in order to increase the residence time and improve the molecular interaction with the electromagnetic field. A post-cooling of the microwave heated water can be also integrated using either a 'Fluid to Fluid Heat Exchanger (FFHE)' or a 'Vapor-Compression Chiller (VCC)', prior entering the existing heat-exchangers used for cooling the crude oil. This can be done either by using: i) a single cooling system FFHE or VCC placed after a 'Pipe Collector (PC)', or ii) multiple FFHE systems placed right after the CMWR prior to the PC system. In addition, the same contaminated water could be used as a cooling liquid in the FFHE systems, (4) repeating the MW treatment 2-3 consecutive times in series to eliminate 100% of bacteria.

It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system, processes and computer implemented control methods, computer system, and computer program product for wet etching wafers. The flowchart and block diagrams in the figures illustrate the architecture, functionality, and operation of possible implementations of systems, methods and computer program products according to various embodiments and arrangements. In this regard, each block in the flowchart or block diagrams as it relates to a computer implemented method can represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A device for treating a liquid for elimination of any bacteria that is present within the liquid comprising:
   an outer housing having a first end and an opposing second end;
   an inlet for receiving untreated liquid;
   an outlet for discharging liquid that has been treated and any bacteria has been eliminated;
   an inlet flow control mechanism for controlling flow of the untreated liquid through the inlet;
   an outlet flow control mechanism for controlling flow of the treated liquid through the outlet;
   a plurality of inner conduits that are in fluid communication with the inlet and the outlet; and
   a source of electromagnetic energy that is disposed along a length of the inner conduits and configured to emit electromagnetic energy to the untreated liquid contained in the inner conduits;

wherein the electromagnetic energy comprises microwave energy and the source of electromagnetic energy comprises a microwave device that includes a microwave transmitter and a microwave receiver both of which are disposed within an interior of the outer housing and define an electromagnetic energy chamber in which the inner conduits are contained, with the microwave transmitter and microwave receiver surrounding the inner conduits.

2. The device of claim 1, further including a fluid separator that receives the untreated liquid from the inlet and is configured for separating the untreated liquid into the plurality of inner conduits that extend longitudinally within the outer housing.

3. The device of claim 1, wherein the device has a first operating state in which both the inlet flow control mechanisms and the outlet flow control mechanism are closed to thereby trap a volume of untreated fluid within the inner conduits for treatment thereof with the electromagnetic energy.

4. The device of claim 1, wherein the device is linear in form, whereby the untreated liquid and subsequently treated liquid flow in a linear fashion through the outer housing, with the inlet at the first end and the outlet at the second end.

5. The device of claim 1, wherein the inlet flow control mechanism comprises an inlet flow control valve and the outlet flow control mechanism comprises an outlet flow control valve.

6. The device of claim 2 wherein the fluid separator comprises a first header space that receives the untreated liquid from the inlet and is in communication with first ends of the inner conduits, the inner conduits being arranged in parallel and the outlet comprises a fluid combiner in that treated liquid from the inner conduits flows into the outlet.

7. The device of claim 1, wherein the inner conduits are tubular structures that are formed of a material that is transmissive of the electromagnetic energy.

8. The device of claim 7, wherein the inner conduits are formed of glass or a high temperature polymer.

9. The device of claim 1, wherein the microwave device is configured to move in a longitudinal direction along lengths of the inner conduits.

10. A device for treating a liquid for elimination of any bacteria that is present within the liquid comprising:
an outer housing having a first end and an opposing second end;
an inlet for receiving untreated liquid;
an outlet for discharging liquid that has been treated and any bacteria has been eliminated;
an inlet flow control mechanism for controlling flow of the untreated liquid through the inlet;
an outlet flow control mechanism for controlling flow of the treated liquid through the outlet;
a plurality of inner conduits that are in fluid communication with the inlet and the outlet; and
a source of electromagnetic energy that is disposed along a length of the inner conduits and configured to emit electromagnetic energy to the untreated liquid contained in the inner conduits;
wherein the device comprises a horizontal closed reactor in that untreated liquid is loaded into the inner conduits with the outlet flow control mechanism being closed and upon filling of the inner conduits with untreated liquid, the electromagnetic energy is delivered to the untreated liquid.

11. The device of claim 1, wherein the device comprises a continuous system in which the untreated liquid is continuously delivered through the inlet to the plurality of inner conduits for being subjected to the electromagnetic energy and the device has a first operating state in which both the inlet flow control mechanism and the outlet flow control mechanism are open to provide a continuous flow of untreated fluid through the inner conduits for treatment thereof with the electromagnetic energy.

12. The device of claim 1, wherein the inlet flow control mechanism comprises a first diaphragm valve and the outlet flow control mechanism comprises a second diaphragm valve.

13. The device of claim 11, further including a sensor that detects a volume of the liquid within the plurality of inner conduits and a controller that is coupled to the sensor so that once the volume of liquid reaches a predetermined fill volume within the plurality of the inner conduits, the source of electromagnetic energy is automatically turned on.

14. The device of claim 13, wherein the predetermined fill volume comprises between about 60% and between about 85% relative to an entire volume of the plurality of the inner conduits.

15. The device of claim 11, wherein the device is configured to be positioned within either a vertical orientation or a horizontal orientation.

16. The device of claim 1, further including a volume sensor that detects a volume of the untreated liquid within the plurality of inner conduits and a controller that is coupled to the volume sensor so that once the volume of untreated liquid reaches a predetermined fill volume within the plurality of the inner conduits, the source of electromagnetic energy is automatically turned on.

17. The device of claim 16, wherein the predetermined fill volume can be a volume between about 60% and about 85% of the total volume of the plurality of inner conduits.

18. The device of claim 1, further including a temperature sensor that monitors a temperature of the treated liquid within the plurality of inner conduits.

19. A device for treating a liquid for elimination of any bacteria that is present within the liquid comprising:
an outer housing having a first end and an opposing second end;
an inlet for receiving untreated liquid;
an outlet for discharging liquid that has been treated and any bacteria has been eliminated;
an inlet flow control mechanism for controlling flow of the untreated liquid through the inlet;
an outlet flow control mechanism for controlling flow of the treated liquid through the outlet;
a plurality of inner conduits that are in fluid communication with the inlet and the outlet; and
a source of electromagnetic energy that is disposed along a length of the inner conduits and configured to emit electromagnetic energy to the untreated liquid contained in the inner conduits;
wherein the electromagnetic energy comprises microwave energy and the source of electromagnetic energy comprises a microwave device that includes a microwave transmitter and a microwave receiver both of which are disposed within an interior of the outer housing and define an electromagnetic energy chamber in which the inner conduits are contained, with the microwave transmitter and microwave receiver surrounding the inner conduits;
wherein the microwave device is operatively connected to a drive mechanism for moving the microwave device in at least one direction relative to the inner conduits.

20. The device of claim 19, wherein the microwave device moves in an axial direction along a longitudinal length of the inner conduits in a back and forth manner.

21. The device of claim 19, wherein the microwave device moves in a rotational direction relative to the inner conduits.

* * * * *